(12) United States Patent
Yang et al.

(10) Patent No.: US 7,275,134 B2
(45) Date of Patent: Sep. 25, 2007

(54) SCSI-TO-IP CACHE STORAGE DEVICE AND METHOD

(75) Inventors: Qing Yang, Saunderstown, RI (US); Xubin He, Cookeville, TN (US)

(73) Assignee: Board of Governors for Higher Education, State of Rhode Island and Providence Plantations, Providence, RI (US)

( * ) Notice: Subject to any disclaimer, the term of this patent is extended or adjusted under 35 U.S.C. 154(b) by 539 days.

(21) Appl. No.: 10/780,108

(22) Filed: Feb. 17, 2004

(65) Prior Publication Data
US 2004/0267902 A1    Dec. 30, 2004

Related U.S. Application Data

(63) Continuation of application No. PCT/US02/26292, filed on Aug. 15, 2002.

(51) Int. Cl.
G06F 12/00    (2006.01)
(52) U.S. Cl. .................. 711/122; 711/135; 710/53
(58) Field of Classification Search ............... 711/122, 711/135; 710/53
See application file for complete search history.

(56) References Cited

U.S. PATENT DOCUMENTS

| 5,754,888 A | 5/1998 | Yang et al. |
| 5,764,903 A | 6/1998 | Yu et al. |
| 5,974,563 A | 10/1999 | Beeler, Jr. et al. |

OTHER PUBLICATIONS

Hyotaek Lim, David Du, "Design Considerations for Hierarchical Web Proxy Server Using iSCSI", 2003 IEEE. Saint '03, Sep. 2003.*
Xubin He, Quin Yang, "Architecture and Performance Potential of STICS—SCSI-to-IP Cache Storage", 2001. Retrieved from http://www.ele.uri.edu/Research/hpcl/STICS/hpca8_stics.pdf on Nov. 8, 2006.*
Xubin He, Quin Yang, "DCD—Disk Caching Disk: A New Approach for Boosting I/O Performance", ACM 1996. ISCA, May 1996.*
Rodney Van Meter, Gregory Finn, Steve Hotz, "VISA: Netstation's Virtual Internet SCSI Adapter", 1998 ACM. ASPLOS VIII, Oct. 1998.*
Kim, Chang-Soo et al.; "Volume management in SAN environment"; *Parallel and Distributed Systems*: 2001, pp. 500-505.

(Continued)

*Primary Examiner*—Donald Sparks
*Assistant Examiner*—Jesse Diller
(74) *Attorney, Agent, or Firm*—Connolly Bove Lodge and Hutz

(57) ABSTRACT

A SCSI-to-IP cache storage system interconnects a host computing device or a storage unit to a switched packet network. The cache storage system includes a SCSI interface (40) that facilitates system communications with a host computing device or the storage unit, and an Ethernet interface (42) that allows the system to receive data from and send data to the Internet. The cache storage system further comprises a processing unit (44) that includes a processor (46), a memory (48) and a log disk (52) configured as a sequential access device. The log disk (52) caches data along with the memory (48) resident in the processing unit (44), wherein the log disk (52) and the memory (48) are configured as a two-level hierarchical cache.

16 Claims, 4 Drawing Sheets

OTHER PUBLICATIONS

Lee, Yong Kyu et al. "Metadata management of the SANtopia file system": *Parallel and Distributed Systems*; 2001; pp. 492-499.

Molero, X. et al.; "On the switch architecture for fibre channel storage area networks"; *Parallel and Distributed Systems*; 2001; pp. 484-491.

Namgoong, Jae-Chang and Chan-Ik Park; "SAN-attached RAID controllers"; *Parallel and Distributed Systems*; 2001; pp. 477-483.

Preslan, K. W. et al.; "A 64-bit, shared disk file system for Linux"; *Mass Storage Systems*; 1999; pp. 22-41.

Voruganti, K. and P. Sarkar; "An analysis of three gigabit networking protocols for storage area networks"; *Performance, Computing, and Communications*; 2001; pp. 259-265.

* cited by examiner

SCSI-TO-IP CACHE STORAGE DEVICE AND METHOD

PRIORITY INFORMATION

This application claims priority from PCT Application No. PCT/US02/26292 filed Aug. 15, 2002. This PCT application is hereby incorporated by reference.

GOVERNMENT LICENSE

This invention was made with government support under Grant Nos. MIP-9714370 and CCR-0073377, awarded by the National Science Foundation. The government has certain rights in this invention.

BACKGROUND OF THE INVENTION

The invention relates to the field of data back-up systems, and in particular to a SCSI-to-IP cache storage device and method for implementing SAN over the Internet.

As we enter a new era of computing, data storage has changed its role from a secondary with respect to CPU and RAM, to a primary role in today's information world. Online data storage doubles approximately every nine months due to the increasing demand for network information services. While the importance of data storage is well-known, published literature is limited in the computer architecture research community reporting networked storage architecture. This situation will change quickly as information has surpassed raw computational power as the important commodity. This is especially true for Internet dependent businesses.

In general networked storage architectures have evolved from network-attached storage (NAS), storage area network (SAN), to more recent storage of IP (iSCSI). NAS architecture allows a storage system/device to be directly connected to a standard network, typically via the Ethernet. Clients on the network can access the NAS directly. A NAS based storage subsystem has a built-in file system to provide clients with file system functionality. SAN technology, on the other hand, provides a simple block level interface for manipulating nonvolatile magnetic media. Typically, a SAN includes networked storage devices interconnected through a dedicated Fibre Channel network. The basic premise of a SAN is to replace the current "point-to-point" infrastructure with one that allows "any-to-any" communications. A SAN provides high connectivity, scalability, and availability using a specialized network interface—the Fibre Channel network. Deploying such a specialized network usually introduces cost for implementation, maintenance, and management. iCSI is the most recent emerging technology with the goal of implementing the SAN technology over the better-understood and mature network infrastructure, the Internet (TCP/IP).

Implementing SAN over IP brings economy and convenience whereas it also raises issues such as performance and reliability. Currently, there are basically two approaches: one encapsulates SCSI protocol in TCP/IP at host bus adapter (HBA) level, and the other carries out SCSI and IP protocol conversion at a specialized switch. However, both approaches have severe performance limitations. To encapsulate SCSI protocol over IP requires a significant amount of overhead traffic for SCSI command transfers and handshaking over the Internet. Converting protocols at a switch places a special burden on an already overloaded switch and creates another specialized piece of network equipment in the SAN.

Furthermore, the Internet was not designed for transferring data storage blocks. Many features such as Maximum Transfer Unit (MTU), data gram fragmentation, routing, and congestion control may become obstacles to providing enough instant bandwidth for large block transfers of storage data.

Therefore, there is a need for a system that can implements SAN over switched packet network, such as for example the Internet (TCP/IP).

SUMMARY OF THE INVENTION

Briefly, according to an aspect of the invention, a SCSI-to-IP cache storage system includes a SCSI interface that facilitates system communication with host computers and extended storage devices. The system also includes an Ethernet interface that allows the system to receive data from and send data to the Internet, and a processing unit that includes a processor and memory. The system also includes a log disk that is a sequential access device. The log disk is used to cache data along with the memory resident in the processing unit. The log disk and the memory are configured as a two-level hierarchical cache for a disk storage device within the SCSI-to-IP cache storage system.

The system of the present invention facilitates implementing SAN over the Internet. The disk storage device within the SCSI-to-IP cache storage system is preferably configured as Besides the regular data storage in the SCSI-to-IP cache storage system, one storage device within the system is used as a non-volatile cache that caches data coming from possibly two directions. That is, block data may come from the SCSI interface, and network data may come from the Ethernet interface. In addition, to standard SCSI and IP protocols running on the intelligent processing unit, a local file system may also reside in the processing unit. The file system is preferably a simplified Log-structured file system that writes data quickly and provides advantages to cache data both ways. Besides caching storage data in both directions, the SCSI-to-IP cache storage systems may also localize SCSI commands and handshaking operations to reduce unnecessary traffic over the Internet. In this way, the SCSI-to-IP cache storage system acts as a storage filter to discard a fraction of the data that would otherwise move across the Internet, reducing the bottleneck imposed on limited Internet bandwidth and increasing storage data rate.

The system of the present invention provides an iSCSI network cache to smooth out the traffic and improve system performance. Such a cache or bridge is not only helpful but also necessary to a certain degree because of the different nature of SCSI and IP such as speed, data unit size, protocols and requirements. Wherever there is a speed disparity, cache of course helps. Analogous to cache memory used to cache memory data for a CPU, the SCSI-to-IP cache storage system is a cache storage used to cache networked storage data for a server host.

The system of the present invention may utilize the Log-structured file system to write data to magnetic media for caching data coming from both directions (e.g., from the Internet and from the host). In addition, since the SCSI-to-IP cache storage system preferably uses log disk to cache data, it is a nonvolatile cache, which is of course desirable for caching storage data reliably since once data is written to storage, it is considered safe.

The SCSI-to-IP cache storage system allows direct connection to a SCSI interface of a computer that in turn can access a SAN implemented over the Internet. In addition, by localizing part of the SCSI protocol and filtering of some unnecessary traffic, the SCSI-to-IP cache storage system can reduce the bandwidth requirement of the Internet to implement the SAN.

These and other objects, features and advantages of the present invention will become apparent in light of the following detailed description of preferred embodiments thereof, as illustrated in the accompanying drawings.

DETAILED DESCRIPTION OF THE INVENTION

Figure 1:
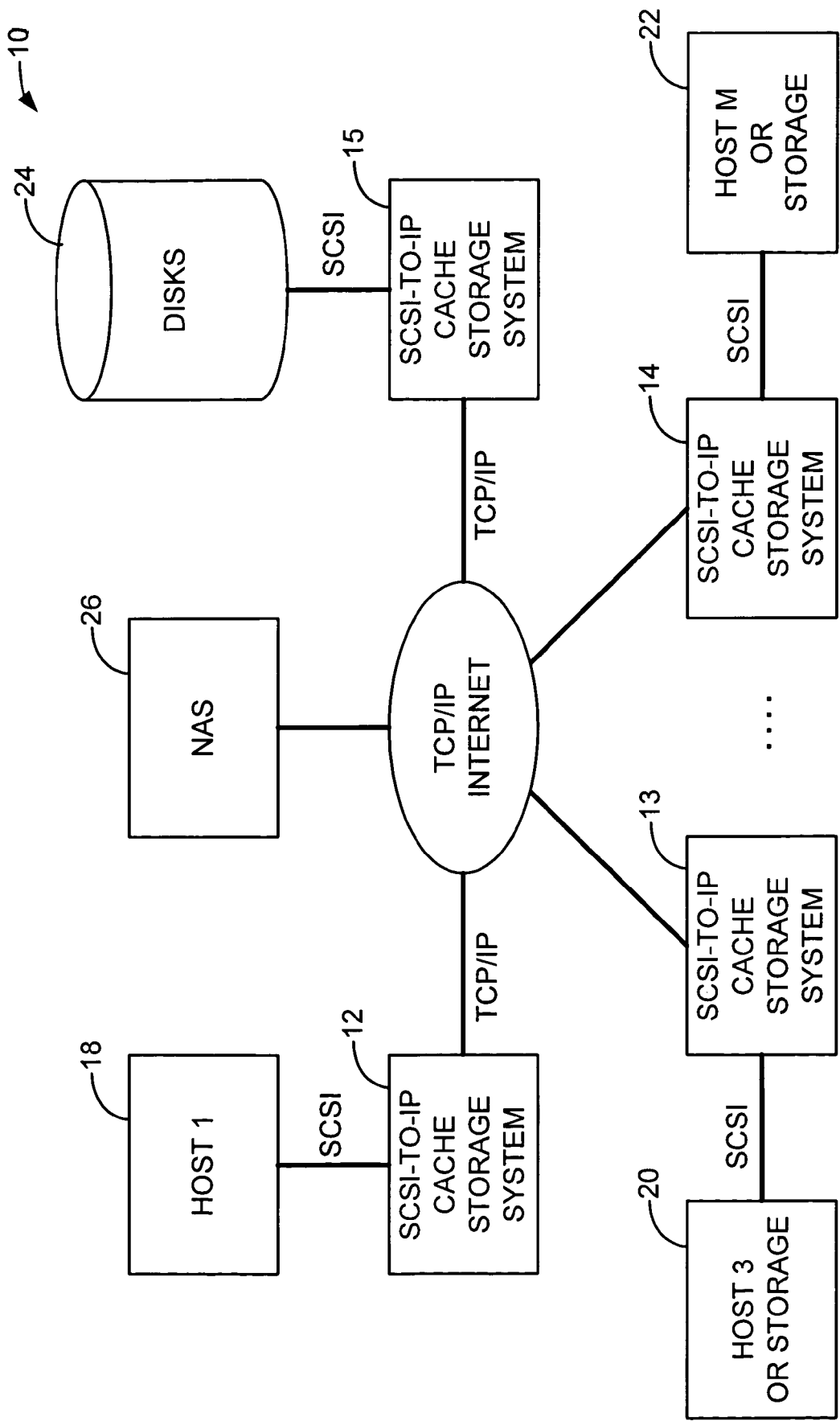
FIG. 1 is a block diagram illustration of a distributed computing and information backup system that includes a SCSI-to-IP cache storage system.

FIG. 1 is a block diagram illustration of a distributed computing and information backup system 10 that includes a plurality of SCSI-to-IP cache storage systems 12-15. Each of the plurality of SCSI-to-IP cache storage systems 12-15 interfaces one of an associated networked device such as a host 18, 20 or a storage device 22, 24 to the Internet. The distributed computing and information backup system 10 also includes network attached storage (NAS) 26 that communicates via the Internet. The system 10 provides a SAN implementation over IP using the SCSI-to-IP cache storage systems 12-15. Although the system 10 illustrated in FIG. 1 includes four SCSI-to-IP cache storage systems 12-15, one of ordinary skill will recognize that virtually any number of computing devices or storage devices can be connected through an associated SCSI-to-IP cache storage system to form the SAN. Significantly, rather than using a specialized network or storage switch, the SCSI-to-IP cache storage systems 12-15 connect a host computer or a storage device to the IP network. The SCSI-to-IP cache storage systems 12-15 each provide SCSI protocol service, caching service, naming service and protocol service.

Figure 2:
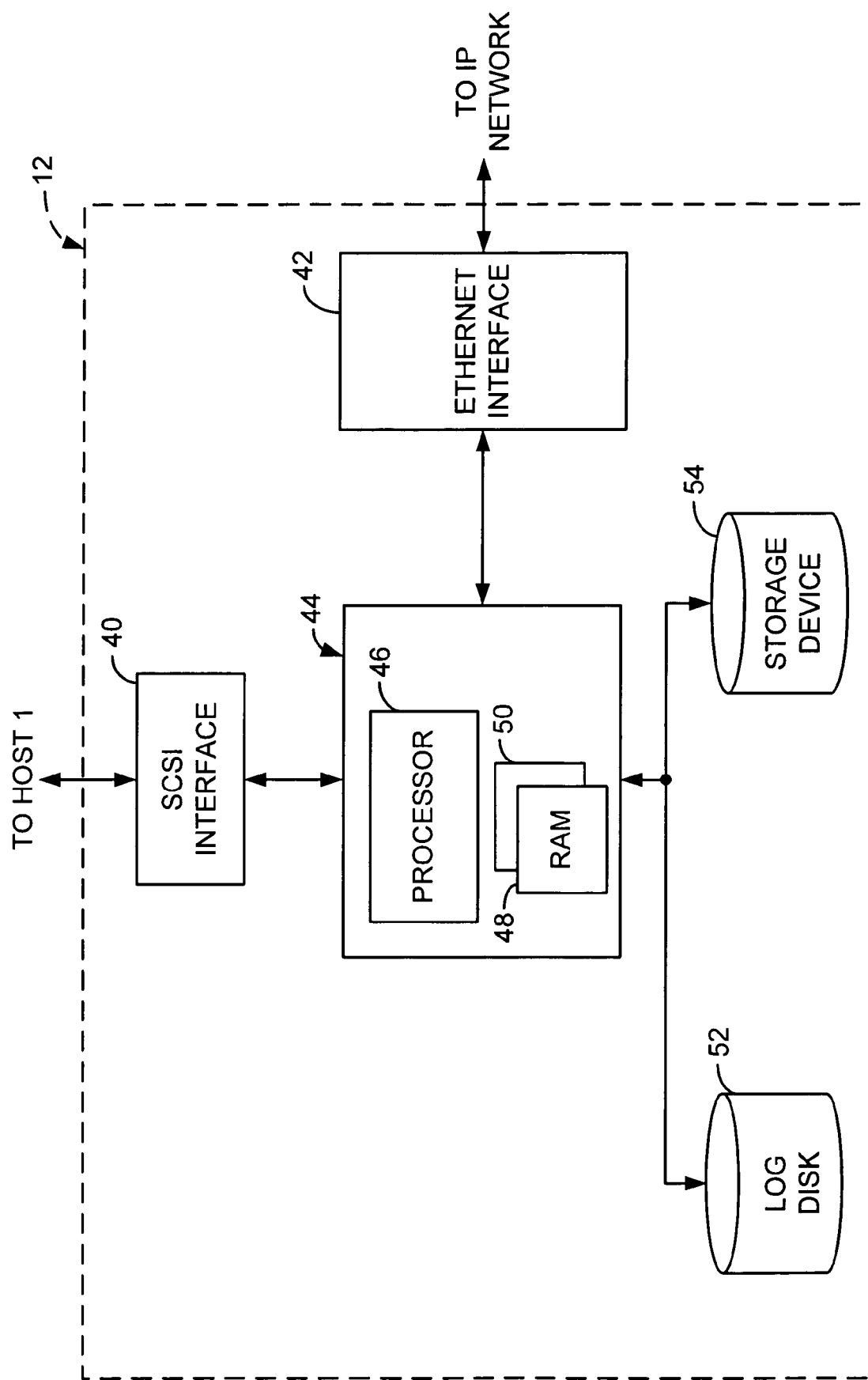
FIG. 2 is a block diagram illustration of one the SCSI-to-EP cache storage systems illustrated in FIG. 1.

FIG. 2 is a block diagram illustration of one of the SCSI-to-IP cache storage systems 12. This cache storage system 12 includes a SCSI interface 40 that supports SCSI communication with the host 18 (FIG. 1) and runs in a target mode receiving requests from the host 18 (FIG. 1), carrying out the I/O processing through the network, and sending back results to the host 18 (FIG. 1). When the SCSI-to-IP cache storage system is used to connect a storage device such as a disk or RAID 22 (FIG. 1) to extended storage, the SCSI-to-IP cache storage system operates in an initiator mode, wherein it sends/forwards SCSI requests to the extended storage mode. Referring to FIG. 1, the SCSI-to-IP cache storage system 12 operates in target mode, while the SCSI-to-IP cache storage system 15 operates in initiator mode. The SCSI-to-IP cache storage system 12 acts as a directly attached local storage device to the host 18 (FIG. 1).

Referring still to FIG. 2, the SCSI-to-IP cache storage system 12 also includes an Ethernet interface 42, which connects the SCSI-to-IP cache storage system to the Internet. A processing unit 44 that includes a processor 46 and RAM 48 is also included in the cache storage system 12. The processing unit 44 executes a log-structured file system, SCSI protocol and IP protocols. The RAM 48 is primarily used as a buffer cache. NVRAM 50 (e.g., 1-4 MB) is also included to maintain meta data such as a hash table, LRU list, and mapping information (STICS_MAP). The meta data is stored in the NVRAM 50 before being written to disk. This of course reduces the frequency of having to write or read meta data to/from disk. Alternatively, it is contemplated that Soft Updates as disclosed in the printed publication by G. Granger, M. McKusick, C. Soules and Y. Pratt, "*Soft Updates: A Solution to the Metadata Update Problem in File Systems*", ACM Transactions on Computer Systems, Vol. 18, No. 2, 2000, pp. 127-135 may be used to keep meta data consistency without using NVRAM. This paper is hereby incorporated by reference.

The SCSI-to-IP cache storage system 12 further comprises a log disk 52, which is a sequential accessed device. The log disk is used to cache data along with the RAM within the processing unit 44. The log disk 52 and the RAM form a two-level hierarchical cache.

The system 12 also includes a storage device 54. The storage device 54 may be configured as a disk, a RAID, or just-bunch-of-disks (JBOD). The storage device 54 can be considered a local disk from the point of view of the host 18 (FIG. 1). From the point of view of the IP network via the network interface 42, the storage device 54 is considered as a component of a networked storage system such as a SAN with an IP address as its ID.

To allow a true "any-to-any" communication between servers and storage devices, a global naming is required. In one embodiment, each of the SCSI-to-IP cache storage systems 12-15 (FIG. 1) is named by a global location number (GLN) which is unique for each of the SCSI-to-IP cache storage systems. An IP address is assigned to each SCSI-to-IP cache storage system and use this IP as the GLN.

Figure 3:
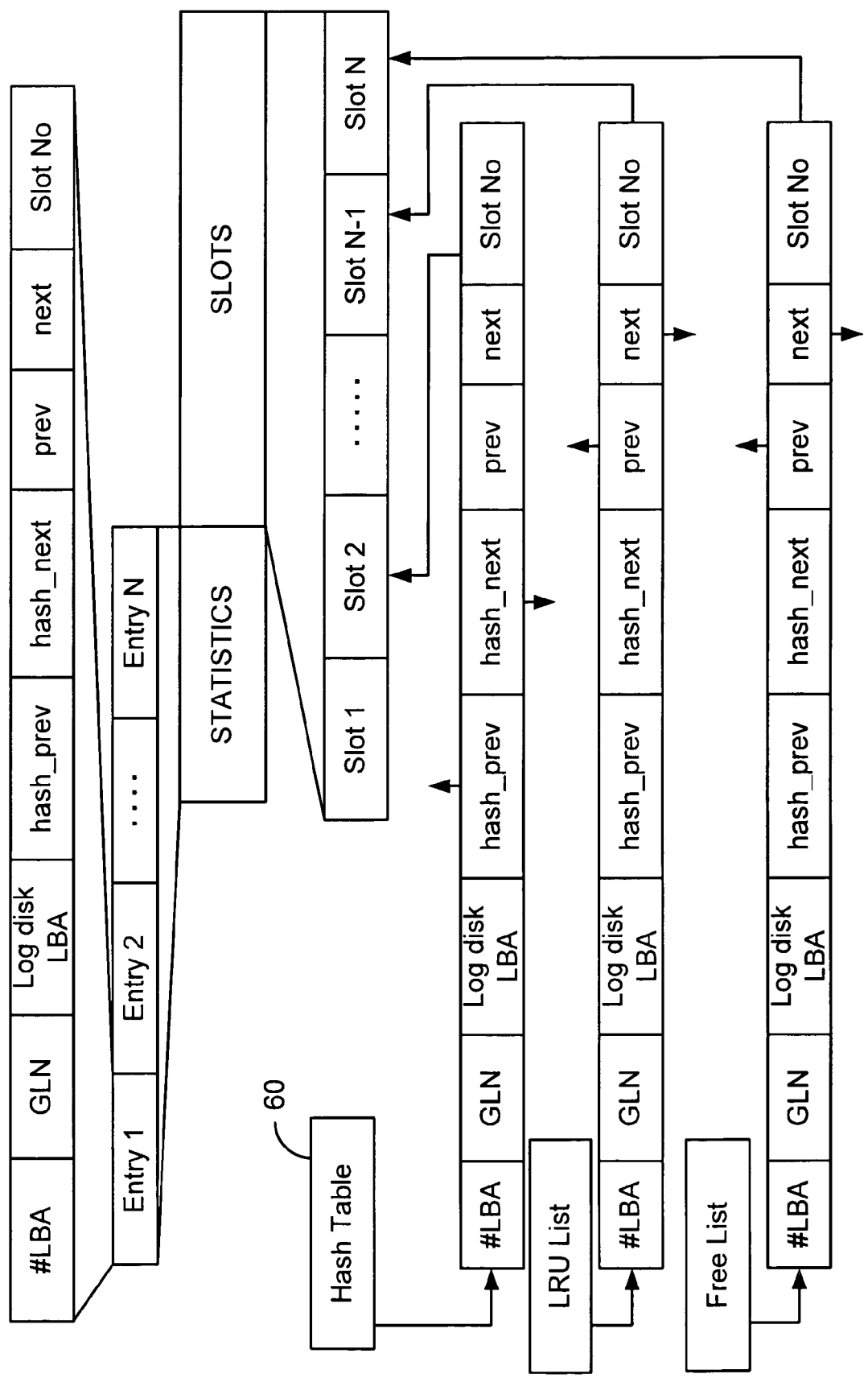
FIG. 3 is a block diagram illustration of a RAM buffer layout.

The cache organization in the SCSI-to-IP cache storage system includes a two level hierarchy: a RAM cache and a log disk. Frequently accessed data reside in the RAM, which is organized as a LRU cache 58 as shown in FIG. 3. Whenever the newly written data in the RAM are sufficiently large or whenever the log disk 52 (FIG. 2) is free, data are written into the log disk. There are also less frequently accessed data kept in the log disk. Data in the log disk are organized in the format of segments similar to that in a Log-structured File System. A segment contains a plurality of slots each of which can hold one data block. Data blocks in segments are addressed by their Segment IDs and Slot IDs.

One of the challenging tasks in this research is to design an efficient data structure and a search algorithm for RAM cache. As shown in FIG. 3, the RAM cache includes a hash table that is used to locate data in the cache, a data buffer which contains several data slots, and a few In-memory headers. Data blocks stored in the RAM cache are addressed by their Logical Block Addresses (LBAs). The hash table contains location information for each of the valid data blocks in the cache and uses LBAs of incoming requests as search keys. The slot size is set to be the size of a block. A slot entry includes the following fields:

An LBA entry that is the LBA of the cache line and serves as the search key of hash table;

Global Location Number (GLN) if the slot contains data from or to other STICS.

A log disk LBA is divided into at least two parts:

1. A state tag (2 bits), used to specify where the slot data is: IN_RAM_BUFFER, IN_LOG_DISK, IN_DATA_DISK or IN_OTHER_STICS;

2. A log disk block index (e.g., 30 bits), used to specify the log disk block number if the state tag indicates IN_LOG_DISK. The size of each log disk can be up to for example $2^{30}$ blocks.

Two pointers (hash_prev and hash_next) are used to link the hash table;

Two pointers (prev and next) are used to link the LRU list and FREE list;

A Slot-No is used to describe the in-memory location of the cached data.

Figure 4:
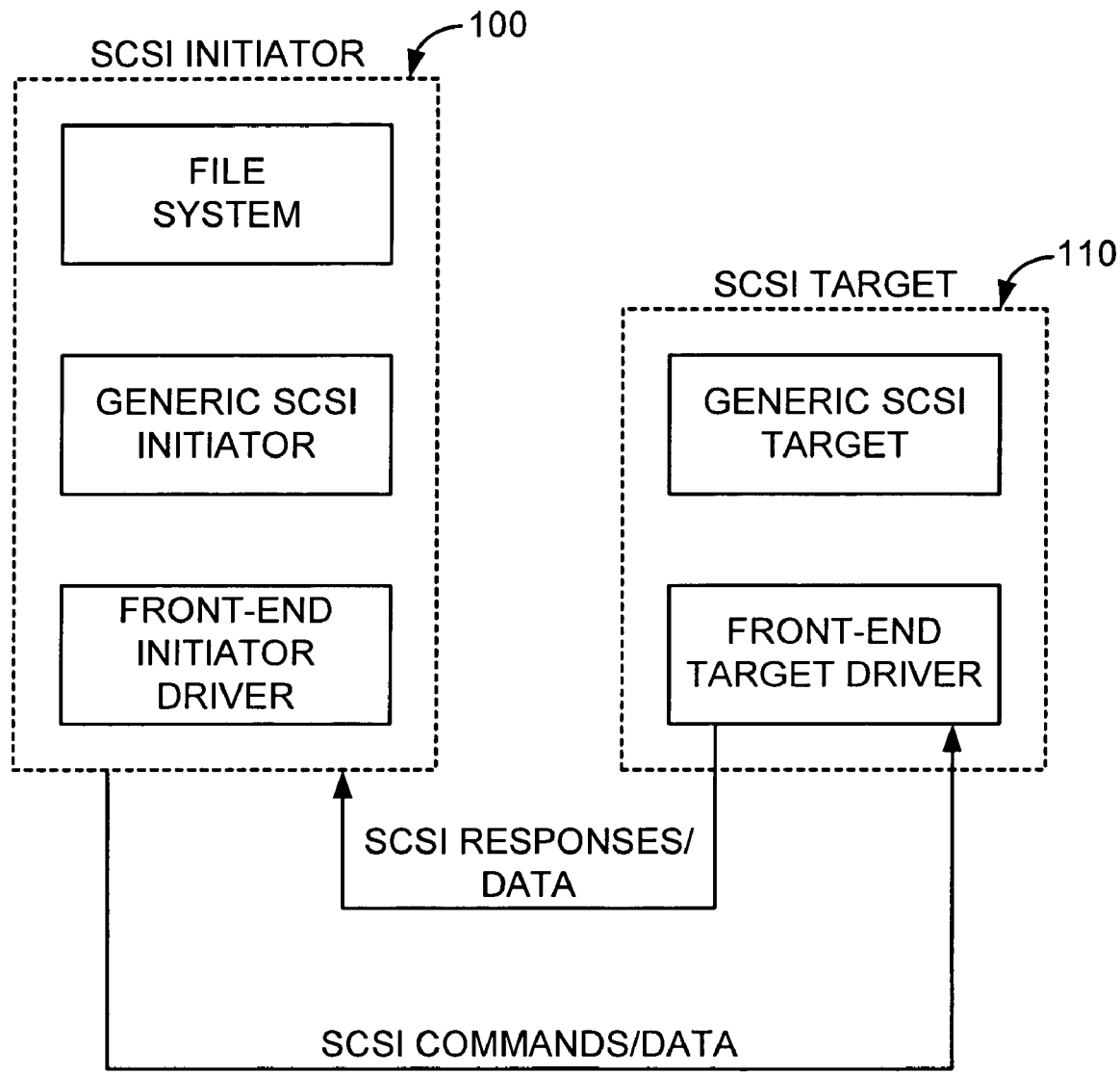
FIG. 4 is a block diagram illustration of a SCSI initiator and target sub-systems.

As set forth above, the SCSI-to-IP cache storage system may run under two modes: (i) initiator mode or (ii) target mode. FIG. 4 is a block diagram illustration of the SCSI-to-IP cache storage system initiator 100 and target modes 110. When running in target mode, the SCSI-to-IP cache storage system is connected to a host and the host is running in initiator mode. Otherwise the SCSI-to-IP cache storage system runs in initiator mode. Initiator mode is the default mode of the SCSI-to-IP cache storage system. All server host platforms including Linux support SCSI initiator mode. The standard SCSI initiator mode operates in the SCSI-to-IP cache storage system. The SCSI target runs in parallel to the initiator and is concerned only with the processing of SCSI commands. A set of target APIs is defined for the SCSI-to-IP cache storage system. These APIs include SCSI functions such as SCSI_DETECT, SCSI_RELEASE, SCSI_READ, SCSI_WRITE and etc. When running under target mode, a SCSI-to-IP cache storage system looks like a standard SCSI device to a connected host.

For each the SCSI-to-IP cache storage system, a variable STICS_LOAD is defined to represent its current load. The higher the STICS_LOAD, the busier the SCSI-to-IP cache storage system is. When a SCSI-to-IP cache storage system starts, its STICS_LOAD is set to zero. When the SCSI-to-IP cache storage system accepts a request, STICS_LOAD is decremented. Besides STICS_LOAD, STICS-MAP is defined to map all the SCSI-to-IP cache storage system loads within the network. STICS_IAP is a set of <GLN, STICS_LOAD>pairs. The STICS_MAP is also updated dynamically.

Write requests may come from one of two sources: the host via the SCSI interface and from another SCSI-to-IP cache storage system via the Ethernet interface. The operations of these two types of writes are as follows.

After receiving a write request from the host via the SCSI interface, the SCSI-to-IP cache storage system searches the hash table by the LBA address. If an entry is found, the entry is overwritten by the incoming write. Otherwise, a free slot entry is allocated from the Free List. the data are copied into the corresponding slot, and its address is recorded in the hash table. The LRU list and Free List are then updated. When enough data slots (e.g., sixteen) are accumulated or when the log disk is idle, the data slots are written into log disk sequentially in one large write. After the log write completes successfully, the SCSI-to-IP cache storage system signals the host that the request is complete.

A packet coming from another the SCSI-to-IP cache storage system via the Ethernet interface may turn out to be a write operation from a remote SCSI-to-IP cache storage system on the network. After receiving such a write request and unpacking the network packet, SCSI-to-IP cache storage systems gets a data block with GLN and LBA. It then searches the Hash Table by the LBA and GLN. If an entry is found, the entry is overwritten by the incoming write. Otherwise, a free slot entry is allocated from the Free List, and the data are then copied into the corresponding slot. Its address is recorded in the Hash Table. The LRU list and Free List are updated accordingly.

Similar to write operations, read operations may also come either from the host via the SCSI interface or from another SCSI-to-IP cache storage system via the Ethernet interface.

After receiving a read request from the host via the SCSI interface, the SCSI-to-IP cache storage system searches the Hash Table by the LBA to determine the location of the data. Data requested may be in one of four different places: (i) the RAM buffer, (ii) the log disk(s), (iii) the storage device in the local SCSI-to-IP cache storage system, or (iv) a storage device in another SCSI-to-IP cache storage system on the network. If the data is found in the RAM buffer, the data are copied from the RAM buffer to the requesting buffer. The SCSI-to-IP cache storage system then signals the host that the request is complete. If the data is found in the log disk or the local storage device, the data are read from the log disk or storage device into the requesting buffer. Otherwise, the SCSI-to-IP cache storage system encapsulates the request including LBA, current GLN, and destination GLN into an IP packet and forwards it to the corresponding SCSI-to-IP cache storage system.

When a read request from another SCSI-to-IP cache storage system via the Ethernet interface is found after unpacking an incomming IP packet, the SCSI-to-IP cache storage system obtains the GLN and LBA from the packet. It then searches the Hash Table by the LBA and the source GLN to determine the location of the data. It locates and reads the data from that location. It sends the data back to the source SCSI-to-IP cache storage system through the network.

The operation of moving data from a higher-level storage device to a lower level storage device is defined as destage operation. There are two levels of destage operations in the SCSI-to-IP cache storage systems: (i) destaging data from the RAM buffer to the log disk (level 1 destage) and (ii) destaging data from log disk to a storage device (level 2 destage). A separate kernel thread, LogDestage, is implemented to perform the destaging tasks. The LogDestage thread is registered during system initialization and monitors the SCSI-to-IP cache storage system states. The thread remains asleep most of the time, and is activated when one of the following events occurs: (i) the number of slots in the RAM buffer exceeds a threshold value, (ii) the log disk is idle, (iii) the SCSI-to-IP cache storage system detects an idle period, or (iv) the SCSI-to-IP cache storage system RAM buffer and/or the log disk becomes full. Level 1 Destage has higher priority than Level 2 Destage. Once the Level 1 destage starts, it continues until a log of data in the RAM buffer is written to the log disk. Level 2 destage may be interrupted if a new request comes in or until the log disk becomes empty. If the destage process is interrupted, the destage thread is suspended until the SCSI-to-IP cache storage system STICS detects another idle period.

For Level 1 Destage, the data in the RAM buffer are written to the log disk sequentially in large size (e.g., 63 KB). The log disk header and the corresponding in-memory slot entries are updated. All data are written to the log disk in "append" mode, which insures that every time the data are written to consecutive log disk blocks.

For Level 2 destage, a "last-write-first-destage" algorithm is employed according to the LRU List. At this point, a SCSI-to-IP cache storage system with the lowest STICS_LOAD is selected to accept data. Each time 64 KB data are read from the consecutive blocks of the log disk and written to the chosen SCSI-to-IP cache storage system storage disks. The LRU list and free list are updated subsequently.

Advantageously, the SCSI-to-IP cache storage system facilitates implementation of SAN over the Internet. The SCSI-to-IP cache storage system allows any server host to access a SAN on Internet through a standard SCSI interface.

Using a non-volatile "cache storage", the SCSI-to-IP cache storage system smoothes out the storage data traffic between SCSI and IP, analogous to the way the cache memory smoothes out CPU-memory traffic.

Although the present invention has been shown and described with respect to several preferred embodiments thereof, various changes omissions and additions to the form and detail thereof, may be made therein, without departing from the spirit and scope of the invention.

What is claimed is:

1. A cache storage system for communicably coupling a host computing device to a switched packet network, the cache storage system comprising:
   a small computer system interface (SCSI) that facilitates system communication with the host computing device;
   a network interface that facilitates system communication with the switched packet network;
   a processing unit that facilitates communication between the SCSI and the network interface, the processing unit comprising a processor and a buffer;
   a log disk coupled to the processing unit, wherein the log disk and the buffer are configured as a two-level hierarchical cache such that least recently used data in the buffer is transferred to the log disk before more recently accessed data is stored in the buffer, the data being transferred from the buffer to the log disk when one of: the amount of data in the buffer exceeds a threshold value or the log disk is idle; and
   a storage device that receives data from and provides data to the two-level hierarchical caches,
   wherein in the event that the amount of data in the log disk exceeds the threshold value, a portion of the data is transferred from the log disk to a remote cache storage system coupled to the switched packet network via the network interface.

2. The cache storage system of claim 1, wherein the host computing device is configured to send a request to the processing unit via the SCSI.

3. The cache storage system of claim 2, wherein the request is a write request such that in the event that the buffer includes an entry associated with the write request, the entry is overwritten with data associated with the write request.

4. The cache storage system of claim 2, wherein the request is a write request such that in the event that the buffer does not include an entry associated with the write request, data associated with the write request is stored in the buffer.

5. The cache storage system of claim 2, wherein the request is a read request such that data associated with the read request is retrieved from one of: the buffer, the log disk, or the storage device, and forwarded to the host computing device.

6. The cache storage system of claim 2, wherein the request is a read request such that the read request is forwarded to a remote cache storage system communicably coupled to the switched packet network, data associated with the read request being returned to the host computing device via the network interface.

7. The cache storage system of claim 1, wherein the processing unit is configured to receive, via the network interface, a request from a remote cache storage system communicably coupled to the switched packet network.

8. The cache storage system of claim 7, wherein the request is a write request such that in the event that the buffer includes an entry associated with the write request, the entry is overwritten with data associated with the write request.

9. The cache storage system of claim 7, wherein the request is a write request such that in the event that the buffer does not include an entry associated with the write request, data associated with the write request is stored in the buffer.

10. The cache storage system of claim 7, wherein the request is a read request such that data associated with the read request is retrieved from one of: the buffer, the log disk, or the storage device, and forwarded to the remote cache storage system via the network interface.

11. The cache storage system of claim 1, wherein the buffer comprises random access memory.

12. The cache storage system of claim 1, wherein the remote cache storage system is operating at the lowest processing load relative to other remote cache storage systems communicably coupled to the switched packet network.

13. A method for storing data in a cache storage system, the method comprising:
   receiving data at a processing unit, wherein the data is sent from one of: a host computing device via a SCSI or a first remote cache storage system communicably coupled to a switched packet network via a network interface;
   storing the received data in a buffer;
   transferring data from the buffer to a log disk when one of: the amount of data in the buffer exceeds a threshold value or the log disk is idle, wherein the transferred data is the least recently used data in the buffer; and
   in the event that the amount of data in the log disk exceeds a threshold, transferring, via the network interface, a portion of the data from the log disk to a second remote cache storage system storage system communicably coupled to the switched packet network.

14. The method of claim 13, wherein the second remote cache storage system is operating at the lowest processing load relative to other remote cache storage systems communicably coupled to the switched packet network.

15. A method for storing data in a cache storage system, the method comprising:
   receiving a read request at a processing unit, wherein the read request is sent from a requesting device, the requesting device being one of: a host computing device or a first remote cache storage system communicably coupled to a switched packet network, the host computing device sending the read request via a SCSI, the first remote cache storage system sending the read request via a network interface;
   retrieving data associated with the read request from one of: a buffer in the processing unit, a log disk coupled to the processing unit, a storage device coupled to the processing unit, or a second remote cache storage system communicably coupled to the switched packet network;
   transferring the retrieved data to the requesting device;
   transferring data from the buffer to the log disk when one of: the amount of data in the buffer exceeds a threshold value or the log disk is idle, wherein the transferred data is the least recently used data in the buffer; and
   in the event that the amount of data in the log disk exceeds the threshold value, transferring, via the network interface, data from the log disk to a third remote cache storage system communicably coupled to the switched packet network.

16. The method of claim 15, wherein the third remote cache storage system is operating at the lowest processing load relative to other remote cache storage systems communicably coupled to the switched packet network.

* * * * *